US011171799B2

(12) United States Patent
Yoneda et al.

(10) Patent No.: US 11,171,799 B2
(45) Date of Patent: Nov. 9, 2021

(54) COMMUNICATION SYSTEM, CONTROL DEVICE, SETTING DEVICE, SETTING METHOD, AND PROGRAM

(71) Applicant: OMRON Corporation, Kyoto (JP)

(72) Inventors: Mitsuhiro Yoneda, Tenri (JP); Shigenori Sawada, Takatsuki (JP); Shinji Murayama, Otsu (JP); Yasuo Muneta, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,444

(22) PCT Filed: Oct. 4, 2018

(86) PCT No.: PCT/JP2018/037155

§ 371 (c)(1),
(2) Date: Feb. 28, 2020

(87) PCT Pub. No.: WO2019/082619

PCT Pub. Date: May 2, 2019

(65) Prior Publication Data

US 2020/0366513 A1 Nov. 19, 2020

(30) Foreign Application Priority Data

Oct. 24, 2017 (JP) ............................ JP2017-205534

(51) Int. Cl.
*H04L 12/28* (2006.01)
*G05B 19/418* (2006.01)
*H04L 29/08* (2006.01)

(52) U.S. Cl.
CPC ........ *H04L 12/28* (2013.01); *G05B 19/41835* (2013.01); *H04L 67/12* (2013.01); *G05B 2219/31001* (2013.01)

(58) Field of Classification Search
USPC ........................................................ 709/223
See application file for complete search history.

(56) References Cited

U.S. PATENT DOCUMENTS 6,493,755 B1 * 12/2002 Hansen ............... H04L 41/0609 709/224
6,701,284 B1 3/2004 Huntley et al.
(Continued)

FOREIGN PATENT DOCUMENTS

CN 104407589 A 3/2015
CN 105182917 A 12/2015
(Continued)

OTHER PUBLICATIONS

Tomio Koyano et al, "Overview of EtherNet/IP and Applications to Industrial Fields", Instrumentation Control Engineering, 2004, vol. 47, No. 11, pp. 67-71, Relevance is indicated in the ISR/WO dated Dec. 4, 2018.

(Continued)

*Primary Examiner* — James E Springer
(74) *Attorney, Agent, or Firm* — Metrolex IP Law Group, PLLC

(57) ABSTRACT

Reliability with which a control device at a transmission destination can receive data is improved. In a communication system in which a plurality of control devices for factory automation are connected to a network, a communication protocol among the control devices includes a publish/subscribe type. Each of the control devices includes: a data storage unit in which control data is stored; a publisher unit that transmits data including a state of the control device of the publisher unit itself to other control devices than the control device; and a subscriber unit that receives data from each of the other control devices. When a state of each of the other control devices that is received by the subscriber unit satisfies a reception allowing condi- (Continued)

tion, the publisher unit transmits the control data of the control device of the publisher unit itself.

15 Claims, 11 Drawing Sheets

(56) References Cited

U.S. PATENT DOCUMENTS

| | | | | |
|---|---|---|---|---|
| 2004/0057451 | A1 | 3/2004 | Tsuneshige et al. | |
| 2004/0172147 | A1 * | 9/2004 | Dillon | G05B 19/4184 700/90 |
| 2009/0282165 | A1 * | 11/2009 | Jammes | H04L 41/00 709/236 |
| 2013/0104236 | A1 * | 4/2013 | Ray | H04L 63/1408 726/25 |
| 2018/0131907 | A1 * | 5/2018 | Schmirler | G05B 23/0216 |

FOREIGN PATENT DOCUMENTS

| | | | |
|---|---|---|---|
| CN | 105324728 | A | 2/2016 |
| JP | H10-164167 | A | 6/1998 |
| JP | 2004-112587 | A | 4/2004 |
| JP | 2010-245824 | A | 10/2010 |
| JP | 2012-124747 | A | 6/2012 |
| WO | 2007/059023 | A2 | 5/2007 |

OTHER PUBLICATIONS

English translation of the International Search Report("ISR") of PCT/JP2018/037155 dated Dec. 4, 2018.

The Written Opinion("WO") of PCT/JP2018/037155 dated Dec. 4, 2018.

Guojing Zhao, "The Software Design and Implementation of Production Process Control System", China Master's Theses Full-text Database, Feb. 29, 2012, pp. 1-73; Relevance is indicated in the (translated) CNOA dated May 25, 2021.

Yiming Hou et al., "Monitoring system for mineral processing equipment based on IoT and industrial cloud computing", Computer Integrated Manufacturing Systems, Sep. 30, 2017, pp. 1972-1982, vol. 23, No. 9, China Academic Journal Electronic Publishing House; Relevance is indicated in the (translated) CNOA dated May 25, 2021.

Yu Zhang, "Design and Application of Communication Control Component in Mine Safety Production System", Colliery Mechanical & Electrical Technology, Jun. 30, 2015, pp. 84-86, 89, No. 6, China Academic Journal Electronic Publishing House; Relevance is indicated in the (translated) CNOA dated May 25, 2021.

Office Action (CNOA) dated May 25, 2021 in a counterpart Chinese patent application.

Extended European search report (EESR) dated Jun. 11, 2021 in a counterpart European patent application.

* cited by examiner

TO/FROM 500
COMMUNICATION I/F
103
MEMORY
104
PROCESSOR
102
SYSTEM PROGRAM
USER APPLICATION PROGRAM
106
107
108
100
Tx/Rx CTRL
Rx BUFFER
Rx
Tx BUFFER
Tx
110
111
112
113
114
115
2
Tx/Rx CTRL
Rx BUFFER
Rx
Tx BUFFER
Tx
120
121
122
123
124
125
3

FIG.4

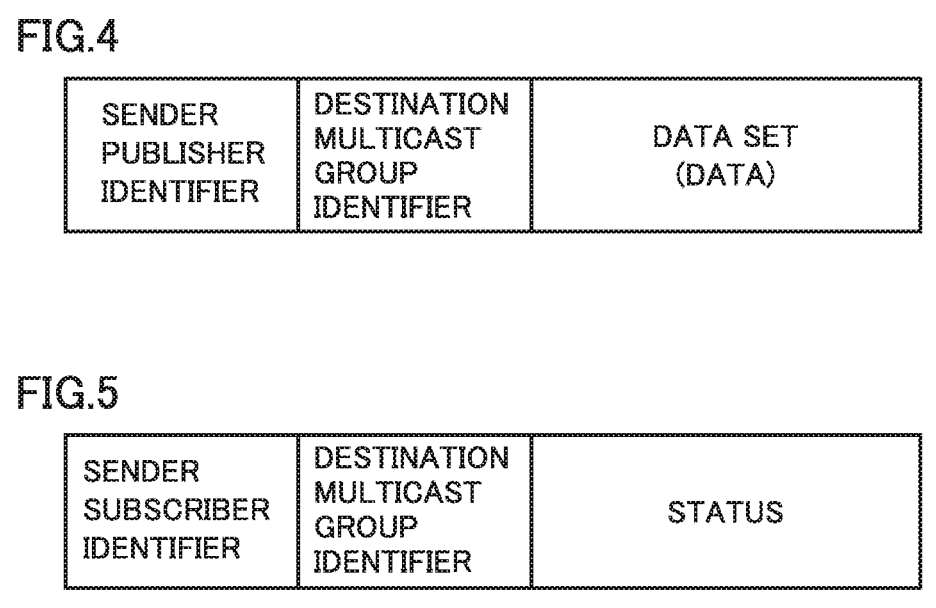

| SENDER PUBLISHER IDENTIFIER | DESTINATION MULTICAST GROUP IDENTIFIER | DATA SET (DATA) |
|---|---|---|

FIG.5

| SENDER SUBSCRIBER IDENTIFIER | DESTINATION MULTICAST GROUP IDENTIFIER | STATUS |
|---|---|---|

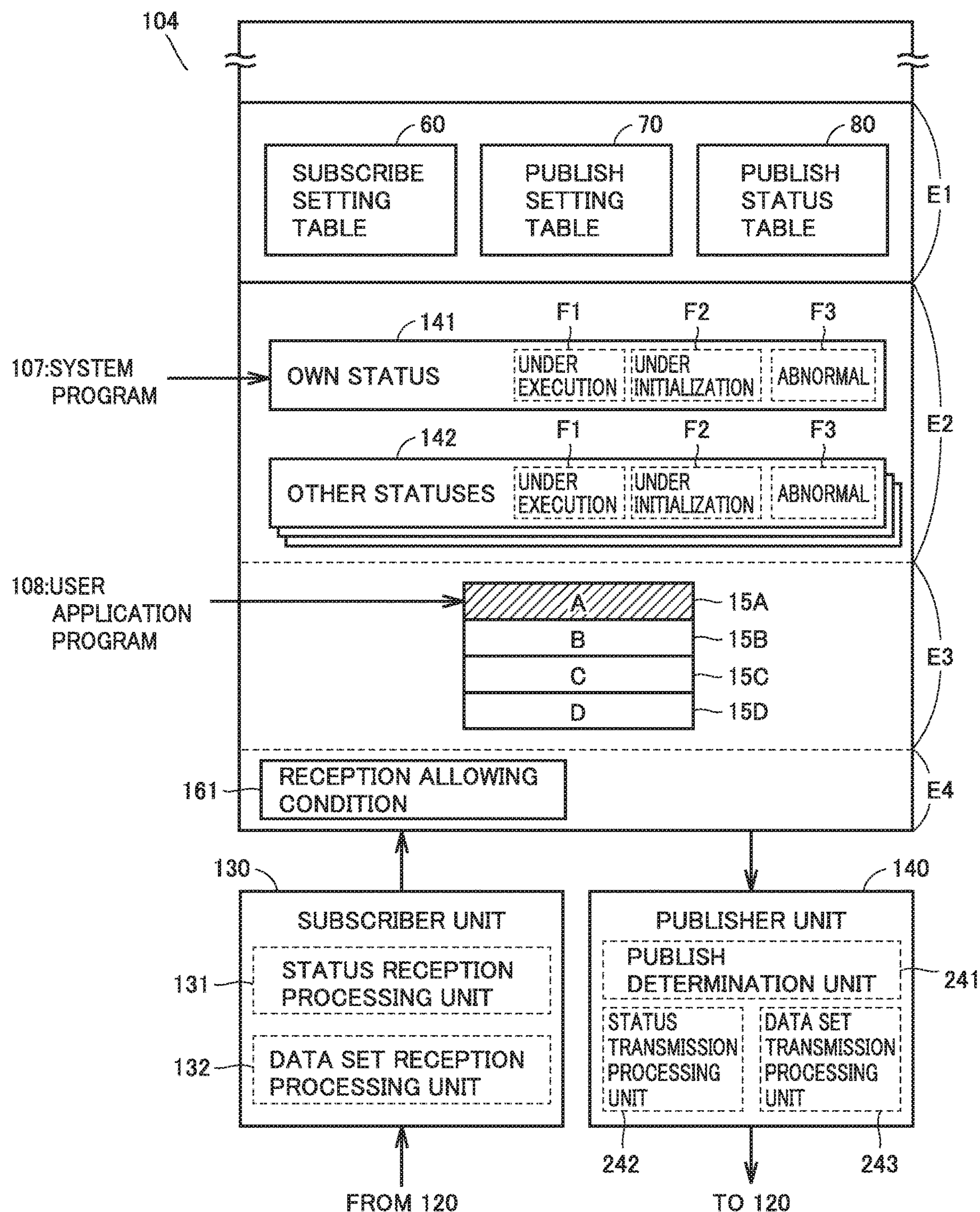
FIG.6
104
60
SUBSCRIBE SETTING TABLE
70
PUBLISH SETTING TABLE
80
PUBLISH STATUS TABLE
E1
141
F1
F2
F3
107:SYSTEM PROGRAM
OWN STATUS
UNDER EXECUTION
UNDER INITIALIZATION
ABNORMAL
E2
142
OTHER STATUSES
UNDER EXECUTION
UNDER INITIALIZATION
ABNORMAL
108:USER APPLICATION PROGRAM
A
B
C
D
15A
15B
15C
15D
E3
161
RECEPTION ALLOWING CONDITION
E4
130
140
SUBSCRIBER UNIT
131
STATUS RECEPTION PROCESSING UNIT
132
DATA SET RECEPTION PROCESSING UNIT
PUBLISHER UNIT
PUBLISH DETERMINATION UNIT
241
STATUS TRANSMISSION PROCESSING UNIT
DATA SET TRANSMISSION PROCESSING UNIT
242
243
FROM 120
TO 120

PUBLISHER OF DATA SET
SUBSCRIBER OF DATA SET
pub
TRANSMIT STATUS
S21
publish
sub
S1: RECEIVE
S3: STORE
S5
NO
TRANSMITTED?
YES
S7: DETERMINE
S9
NO
OK?
YES
pub
S11: TRANSMIT
sub
publish
RECEIVE DATA SET
S23
STORE
S25
pub
publish
NOTIFY
S27
sub
S29: RECEIVE 500
510
CPU
512
MEMORY
513
TIMER
514
HARD DISK
528
518
INPUT INTERFACE
520
DISPLAY CONTROLLER
524
COMMUNICATION INTERFACE
526
DATA READER/ WRITER
504
TOUCHPAD
502
DISPLAY
TO/FROM 100
506
STORAGE MEDIUM
501

COMMUNICATION SYSTEM, CONTROL DEVICE, SETTING DEVICE, SETTING METHOD, AND PROGRAM

TECHNICAL FIELD

The present disclosure relates to a communication system for factory automation (FA), a control device for the communication system, a setting device and a setting method each for setting information in the control device, and a program of the setting method.

BACKGROUND ART

In various manufacturing sites, the FA technology using a control device such as a programmable controller has become widespread. For example, Japanese Patent Laying-Open No. 10-164167 (PTL 1) discloses a programmable controller that conducts cyclic communication with other programmable controllers. This programmable controller broadcasts data to other programmable controllers.

CITATION LIST

Patent Literature

PTL 1: Japanese Patent Laying-Open No. 10-164167

SUMMARY OF INVENTION

Technical Problem

In the cyclic communication in PTL 1, one programmable controller broadcasts data without checking whether other programmable controllers can receive the data or not. This may cause a situation where some of the other programmable controllers cannot receive data, but PTL 1 fails to propose a configuration for preventing this situation.

Accordingly, one object of the present disclosure is to provide a communication system for improving the reliability with which control devices such as other programmable controllers at transmission destinations can receive data.

Solution to Problem

A communication system according to an example of the present disclosure is a communication system in which a plurality of control devices for controlling factory automation are connected to a network. A communication protocol among the control devices includes a publish/subscribe type. Each of the control devices includes: a data storage unit in which control data of the factory automation is stored; a publisher unit that transmits data including a state of the control device of the publisher unit itself to each of other control devices than the control device; and a subscriber unit that receives data from each of the other control devices. When a state of each of the other control devices that is received by the subscriber unit satisfies a reception allowing condition, the publisher unit transmits the control data of the control device of the publisher unit itself to each of the other control devices.

According to the present disclosure, in communication according to the publish/subscribe-type communication protocol, the control data is published (transmitted) when the states of the other control devices as subscribers satisfy the reception allowing condition. Thus, a communication system can be provided that improves the reliability with which a control device can receive control data even in the publish/subscribe-type communication through which no connection is established.

In the above disclosure, the control data in the data storage unit is updated in a predetermined cycle. The control data includes a plurality of types of control data. Among the types of control data, the publisher unit transmits one or more types of control data conforming to a predetermined setting in synchronization with the predetermined cycle.

According to the present disclosure, a certain type of control data that conforms to the predetermined setting can be cyclically published (transmitted).

In the above disclosure, the control data includes a plurality of types of control data, and the reception allowing condition is different for each of the types of control data.

According to the present disclosure, different reception allowing conditions can be set for each of the types of control data that are to be published (transmitted).

In the above disclosure, the reception allowing condition is configured to include an operation using a value shown by the state.

According to the present disclosure, the reception allowing condition can be set by the operation using the value shown by the state of each of the other control devices that are to subscribe (receive) the control data.

In the above disclosure, the publisher unit cyclically transmits the state.

According to the present disclosure, the control device can cyclically receive the state from each of the other control devices, and can determine by using the state received latest whether the reception allowing condition is satisfied or not.

In the above disclosure, the publisher unit transmits a notification when the publisher unit receives the control data from at least one of the other control devices.

According to the present disclosure, when the control device publishes (transmits) the control data to each of the other control devices, it can subscribe (receive) the notification from each of the other control devices. Thereby, the control device can utilize the notification as a criterion for determining whether each of the other control devices successfully subscribes (receives) the control data or not.

A setting device according to an example of the present disclosure is a setting device that sets information in each of a plurality of control devices connectable to a network of factory automation. A communication protocol between a control device and other control devices among the control devices includes a publish/subscribe type. Each of the control devices includes: a data storage unit in which control data of the factory automation is stored; a publisher unit that transmits data including a state of the control device of the publisher unit itself to each of the other control devices; and a subscriber unit that receives data from each of the other control devices. The setting device includes a setting unit that sets a reception allowing condition of the control data that is to be received by the subscriber unit of each of the other control devices such that the reception allowing condition includes a state received from each of the other control devices.

According to the present disclosure, in communication according to the publish/subscribe-type communication protocol, the setting device sets the reception allowing condition in the control device so as to publish (transmit) control data when the state of each of the other control devices as subscribers satisfies the reception allowing condition. Thereby, the reception allowing condition can be set so as to improve the reliability with which the control device can receive control data even in the publish/subscribe-type communication through which no connection is established.

In the above disclosure, the control data in the data storage unit is updated in a predetermined cycle. The control data includes a plurality of types of control data. Among the types of control data, the publisher unit transmits one or more types of control data conforming to a predetermined setting in synchronization with the predetermined cycle.

According to the present disclosure, a certain type of control data conforming to the predetermined setting can be cyclically published (transmitted).

In the above disclosure, the setting device further includes an operation accepting unit that accepts a user operation for the setting device, and sets the reception allowing condition based on a content of the user operation accepted.

According to the present disclosure, the user can set the reception allowing condition for the control device by operating the setting device.

In the above disclosure, the control data includes a plurality of types of control data, and the setting unit sets the reception allowing condition that is different for each of the types of control data.

According to the present disclosure, different reception allowing conditions can be set for each of the types of control data that are to be published (transmitted).

In the above disclosure, the reception allowing condition is configured to include an operation using a value shown by the state.

According to the present disclosure, the reception allowing condition can be set by the operation using the value shown by the state of each of the other control devices that are to subscribe (receive) the control data.

A control device according to an example of the present disclosure is a control device applied to a communication system in which a plurality of control devices for controlling factory automation are connected to a network. A communication protocol among the control devices includes a publish/subscribe type. Each of the control devices includes: a data storage unit in which control data of the factory automation is stored; a publisher unit that transmits data including a state of the control device of the publisher unit itself to each of other control devices than the control device; and a subscriber unit that receives data from each of the other control devices. When a state of each of the other control devices that is received by the subscriber unit satisfies a reception allowing condition, the publisher unit transmits the control data of the control device of the publisher unit itself to each of the other control devices.

According to the present disclosure, in communication according to the publish/subscribe-type communication protocol, the control data is published (transmitted) when the state of each of the other control devices as subscribers satisfies the reception allowing condition. Thereby, even in the publish/subscribe-type communication through which no connection is established, the reliability with which the control device can receive control data can be improved.

In the above disclosure, the control data in the data storage unit is updated in a predetermined cycle. The control data includes a plurality of types of control data. Among the types of control data, the publisher unit transmits one or more types of control data conforming to a predetermined setting in synchronization with the predetermined cycle.

According to the present disclosure, a certain type of control data conforming to the predetermined setting can be cyclically published (transmitted).

A setting method according to an example of the present disclosure is a setting method of setting information in each of a plurality of control devices connectable to a network of factory automation. A communication protocol among the control devices includes a publish/subscribe type. Each of the control devices includes: a data storage unit in which control data of the factory automation is stored; a publisher unit that transmits data including a state of the control device of the publisher unit itself; and a subscriber unit that receives data from each of other control devices than the control device. The setting method includes: by a processor, accepting a user operation for the processor; and, by the processor, by using a content of the user operation, setting a reception allowing condition of the control data that is to be received by the subscriber unit of each of the other control devices such that the reception allowing condition includes a state received from each of the other control devices.

According to the present disclosure, in communication according to the publish/subscribe-type communication protocol, a setting can be made such that control data is published (transmitted) when the state of each of the other control devices as subscribers satisfies the reception allowing condition. Thereby, even in the publish/subscribe-type communication through which no connection is established, the reliability with which the control device can receive control data can be improved.

In the above disclosure, the control data in the data storage unit is updated in a predetermined cycle. The control data includes a plurality of types of control data. Among the types of control data, the publisher unit transmits one or more types of control data conforming to a predetermined setting in synchronization with the predetermined cycle.

According to the present disclosure, a certain type of control data conforming to the predetermined setting can be cyclically published (transmitted).

In an example of the present disclosure, a program for causing a computer to execute the above-described setting method is provided.

Advantageous Effects of Invention

An example of the present disclosure allows improvement in reliability with which each of the other control devices at the transmission destinations can receive control data.

BRIEF DESCRIPTION OF DRAWINGS

FIG. 4 is a diagram showing an example of the configuration of a frame according to the present embodiment.

FIG. 5 is a diagram showing an example of the configuration of the frame according to the present embodiment.

FIG. 6 is a diagram showing an example of the functional configuration of PLC 100 according to the present embodiment.

DESCRIPTION OF EMBODIMENTS

Figure 1:
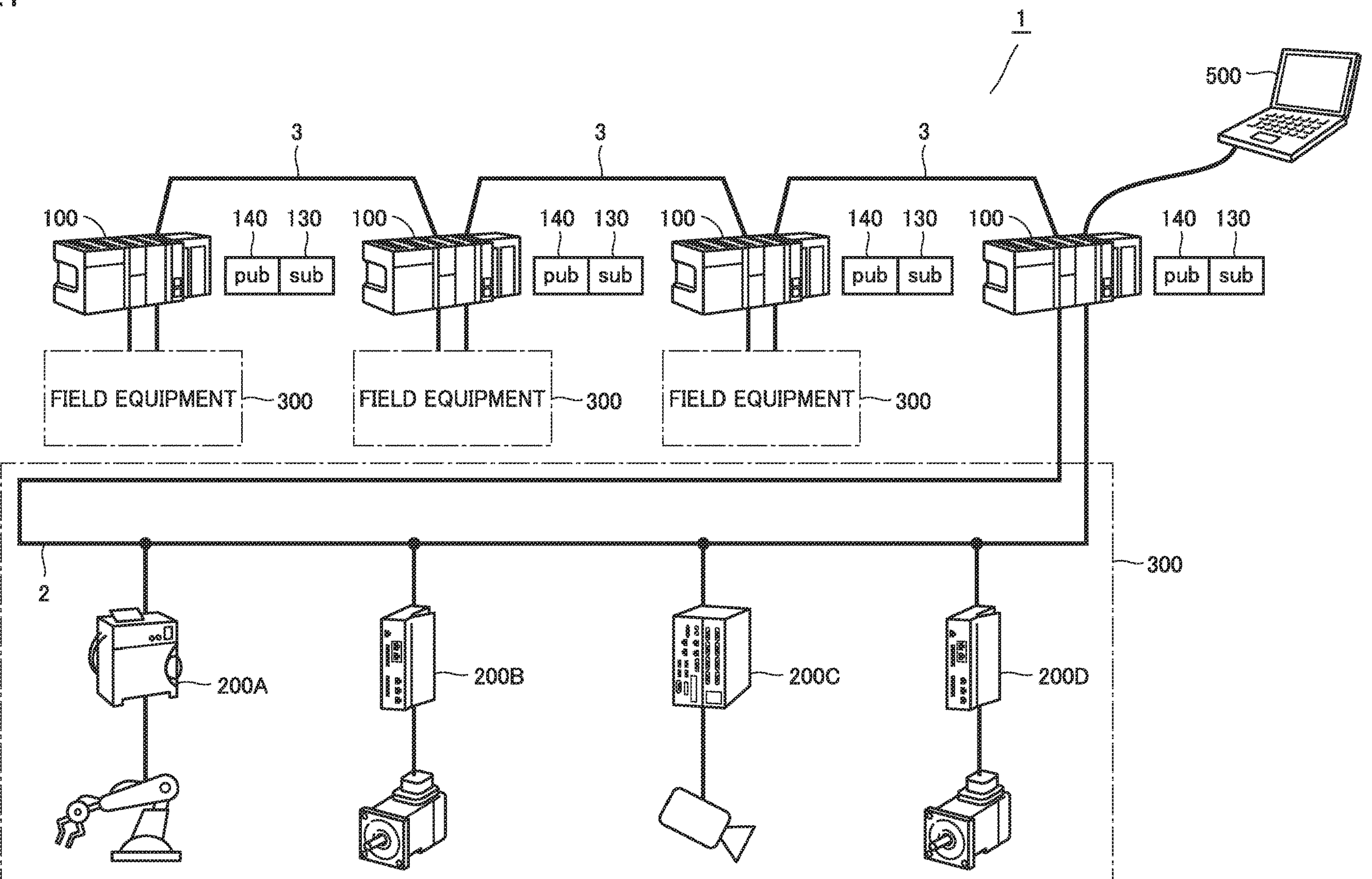
FIG. 1 is a schematic diagram showing an example of a scene to which a communication system 1 according to the present embodiment is applied.

The embodiments of the present invention will be hereinafter described in detail with reference to the accompanying drawings, in which the same or corresponding components will be designated by the same reference characters, and the description thereof will not be repeated.

A. Application Example

First, referring to FIG. 1, an example of a scene to which the present invention is applied will be hereinafter described. FIG. 1 is a schematic diagram showing an example of a scene to which a communication system 1 according to the present embodiment is applied. A programmable logic controller (PLC) 100 according to the present embodiment is one example of a control device for controlling an optional control target (for example, a target such as FA manufacturing apparatus and facility). PLC 100 corresponds to an industrial controller that controls control targets such as various types of facilities and apparatuses. PLC 100 is one type of computer that executes a control operation.

First, the entire configuration of communication system 1 according to the present embodiment will be described. FIG. 1 schematically shows the configuration of communication system 1 according to the present embodiment. Communication system 1 includes a network 3 and a plurality of PLCs 100 connected to network 3. PLC 100 corresponds to a control device that controls the control target for FA by using control data. In FIG. 1, the control target is included in field equipment 300 connected to network 2. FIG. 1 shows four PLCs 100, but the number of PLCs 100 may be less than four or may be five or more as long as a plurality of PLCs 100 are provided.

Field equipment 300 includes a plurality of devices 200A to 200D (which may be hereinafter also collectively referred to as a "device 200") connected to PLC 100 through network 2. Each PLC 100 functions as a master that manages data transmission within network 2 while devices 200A to 200D each function as a slave that transmits data according to an instruction from the master.

In the present embodiment, control targets such as a sensor and an actuator may be directly connected to PLC 100 or may be connected to PLC 100 through network 2 and devices 200A to 200D as shown in FIG. 1.

Each of devices 200 includes: an input device that obtains a field signal; and an output device or an actuator that performs a certain action for a field according to an instruction from PLC 100. Network 2 provides input and device control as a main function.

The processes executed in PLC 100 includes: a process of collecting data collected or generated in device 200; a process of generating data such as an instruction and the like to device 200; a process of transmitting the generated output data to target device 200; and a process of conducting data communication with other PLCs 100. This data communication process includes a process in which PLC 100 transmits the control data used for controlling the target to one or more of other PLCs 100 such that the production procedure is consistent between this PLC 100 and one or more of other PLCs 100. Such control data includes, but not limited to, recipe data (data including conditions such as production procedures, production types, or parameters suitable for production), for example.

In communication system 1 according to the present embodiment, communication according to the publish-subscribe type communication protocol not requiring establishment of connection among PLCs 100 may be applied to the communication among PLCs 100 through network 3. More specifically, communication according to a publish-subscribe type communication protocol of the OPC Unified Architecture (OPC UA) may be applied. In communication system 1, in publish/subscribe communication (which will be hereinafter also referred to as pub/sub communication), PLC 100 on the transmitting side that creates (generates) transmission data and transmits the data will be referred to as a publisher, and PLC 100 on the receiving side that receives the data transmitted by the publisher directly from the publisher or through another publisher will be referred to as a subscriber.

In communication system 1, when the publisher transmits the same data to one or more of other PLCs 100 through network 3 in pub/sub communication, it transmits the data in a multicast manner using a multicast group. The multicast group includes a plurality of PLCs 100 connectable to network 3 and is a set of PLCs 100 establishing a relation in which PLCs 100 transmit or receive data to and from one another.

In the present embodiment, PLC 100 includes a subscriber unit 130 and a publisher unit 140 as shown in FIG. 1. By parallel operation of subscriber unit 130 and publisher unit 140, PLC 100 operates as both publisher unit 140 and subscriber unit 130. Thereby, in pub/sub communication, each PLC 100 can transmit data to other PLCs 100 in the multicast group to which each PLC 100 belongs, and also can receive the data transmitted from other PLCs 100 in the multicast group.

In communication system 1, publisher unit 140 in each PLC 100 publishes (transmits) the data including at least the state of PLC 100 of this publisher unit 140 in a multicast manner while subscriber unit 130 subscribes (receives) the data including at least the states from other PLCs 100. When the states of other PLCs 100 received by subscriber unit 130 satisfy the reception allowing condition, publisher unit 140 publishes (transmits) the control data included in PLC 100 of this publisher unit 140 to other PLCs 100 in a multicast manner.

Thus, even in the case where the pub/sub communication according to the publish-subscribe type communication protocol (that is, no connection is established) is applied to the communication among PLCs 100, each PLC 100 can publish (transmit) the control data of FA when other PLCs 100 at transmission destinations satisfy the reception allowing condition. This allows improvement in reliability with which other PLCs 100 at the transmission destinations can receive control data.

Furthermore, the control data stored in each PLC 100 is updated cyclically. Also, this control data includes a plurality of types of control data. Publisher unit 140 transmits, to other PLCs 100, one or more types of control data conforming to a predetermined setting among the plurality of types of control data.

In this way, the present embodiment can implement a data link including: sharing of control data among PLCs 100; according to the setting predetermined for this sharing (that is, in a program-less manner), sharing of one or more types of control data; and publishing in synchronization with the update cycle of the control data (that is, cyclically).

In the embodiment, publisher unit 140 in PLC 100 publishes (transmits) the state of this PLC 100 cyclically in a predetermined cycle. Thus, based on the latest states of other PLCs 100, each PLC 100 can determine whether the above-mentioned reception allowing condition is satisfied or not.

The reception allowing condition is configured to include an operation using a value shown by the state. By changing the type of the state transmitted from publisher unit 140, or by changing an operator, the reception allowing condition can be changed.

The reception allowing condition can also be set for each type of control data. The control data may include a data set that is a set of data. When the data set is transmitted as control data, the reception allowing condition can be changed for each data set or for each data constituting the data set.

Furthermore, a support device 500 as shown in FIG. 1 may be connected to PLC 100. Support device 500 serves as a device for supporting: a preparation required for PLC 100 to manage network 2 or network 3; a preparation required for PLC 100 to control a control target; and the like. Support device 500 provides a user with a setting environment and the like for setting, for example, a parameter (configuration) of device 200 connected to PLC 100 with regard to management of network 2. Support device 500 is also one example of the "setting device" that provides the user with a setting environment and the like for setting, for example, various parameters (configurations) including the reception allowing condition related to pub/sub communication with regard to management of network 3. Support device 500 may include a personal computer (PC) and the like in which a setting tool for providing a setting environment and the like is installed.

In communication system 1, support device 500 is provided separately from PLC 100 as shown in FIG. 1, but may be provided integrally with PLC 100. In other words, the function of support device 500 may be incorporated in PLC 100.

In the following, a more specific application example of the present embodiment will be described.

B. Configuration Example of PLC 100

Figure 2:
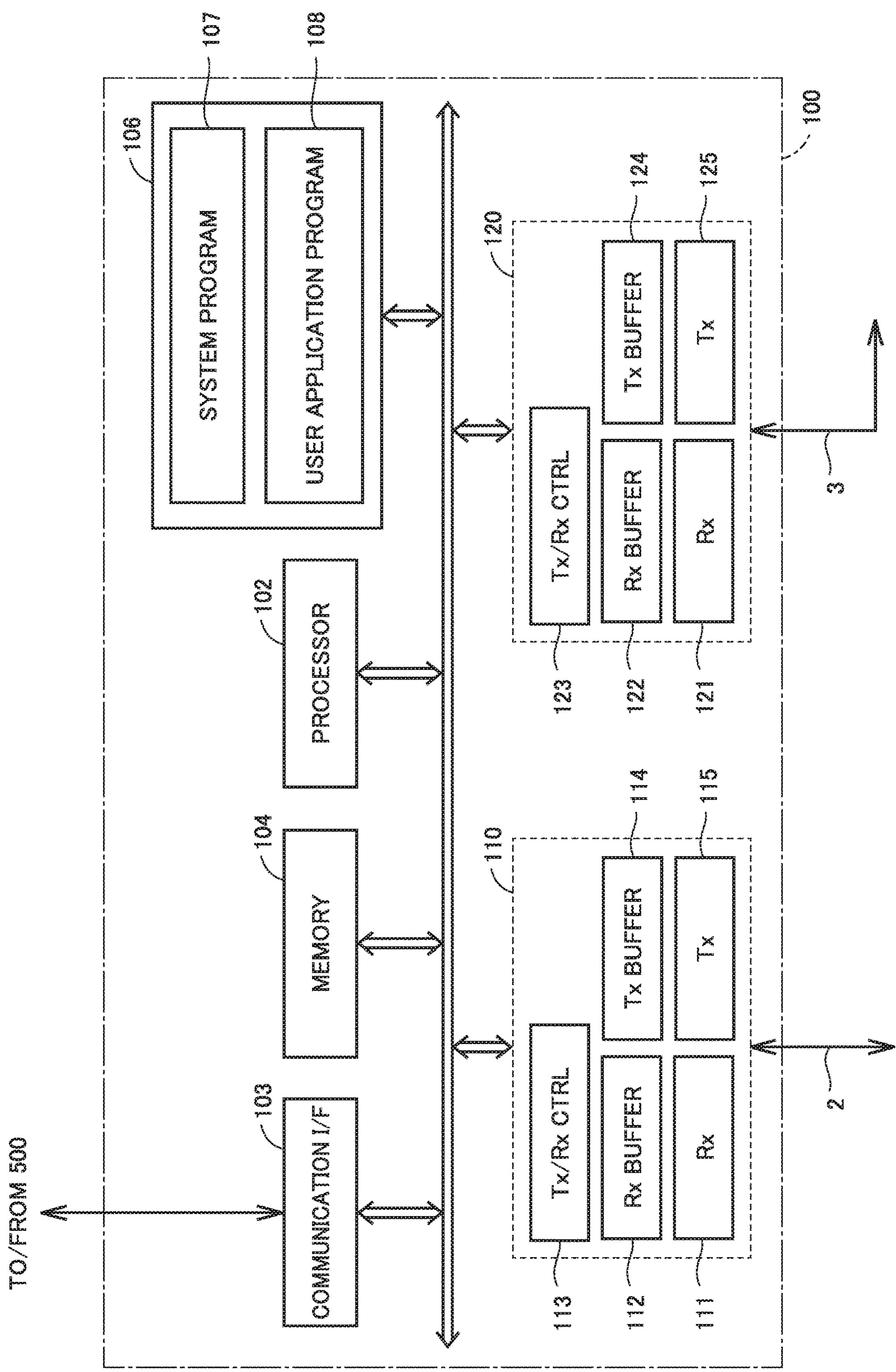
FIG. 2 is a diagram schematically showing the configuration of a PLC 100 according to the present embodiment.

Then, an example of the configuration of PLC 100 according to the present embodiment will be described. FIG. 2 is a diagram schematically showing the configuration of PLC 100 according to the present embodiment. Each PLC 100 has the same configuration.

Referring to FIG. 2, PLC 100 includes, as main components: a processor 102; memory 104; storage 106; a network controller 110 for communication with network 2; and a network interface 120 for communication with network 3. PLC 100 also includes an interface (I/F) 103 that communicates with support device 500.

Storage 106 stores not only a system program 107 for controlling each component of PLC 100, but also a user application program 108 designed in accordance with a control target and the like. Processor 102 reads system program 107 and user application program 108 stored in storage 106 into memory 104, and then executes these programs, thereby implementing various processes including the processes as described later. Memory 104 is formed of a volatile storage device such as dynamic random access memory (DRAM) and static random access memory (SRAM).

The storage medium including memory 104 or storage 106 is a medium in which the information such as a program recorded in the storage medium is accumulated through an electric action, a magnetic action, an optical action, a mechanical action, or a chemical action such that other devices including a computer, machines and the like can read the information such as a program. From this storage medium, PLC 100 may obtain the program of subscriber unit 130 and/or publisher unit 140 which will be described later, and/or various types of data in FIG. 6 which will be described later.

Network controller 110 provides an interface through which PLC 100 exchanges data with each device 200 through network 2. Network controller 110 includes a reception circuit (Rx) 111, a reception buffer 112, a transmission/reception controller 113, a transmission buffer 114, and a transmission circuit (Tx) 115, as main components.

Reception circuit 111 receives a frame transmitted over network controller 110 in a constant cycle, and writes the data stored in the received frame into reception buffer 112. Transmission/reception controller 113 sequentially reads the received frames written into reception buffer 112. From the read frames, transmission/reception controller 113 extracts only the data required for the process in PLC 100. Then, transmission/reception controller 113 outputs the extracted data to processor 102. According to the instruction from processor 102, transmission/reception controller 113 sequentially writes, into transmission buffer 114, the data or the frame to be transmitted to device 200. In synchronization with the cycle in which the frame is transmitted over network controller 110, transmission circuit 115 sequentially transmits the data stored in transmission buffer 114 to network 2.

Network interface 120 provides an interface through which PLC 100 exchanges data with other PLCs 100 via network 3. Network interface 120 includes a reception circuit (Rx) 121, a reception buffer 122, a transmission/reception controller 123, a transmission buffer 124, and a transmission circuit (Tx) 125, as main components.

Reception circuit 121 receives a frame transmitted over network interface 120, and writes the data stored in the received frame into reception buffer 122. Transmission/reception controller 123 sequentially reads the received frames written into reception buffer 122. From the read frames, transmission/reception controller 123 extracts only the data required for the process in PLC 100. Then, transmission/reception controller 123 outputs the extracted data to processor 102. According to the instruction from processor 102, transmission/reception controller 123 sequentially writes, into transmission buffer 124, the data or the frames to be transmitted to other PLCs 100. In synchronization with the cycle in which the frame is transmitted over network interface 120, transmission circuit 125 sequentially transmits the data stored in transmission buffer 124 to network 3.

In the present embodiment, the data transmitted through network 2 or 3 is transmitted in a frame format, which is however merely by way of example, and the transmission data format is not limited to a frame.

C. Data Sharing (Data Link) by Pub/Sub Communication

Figure 3:
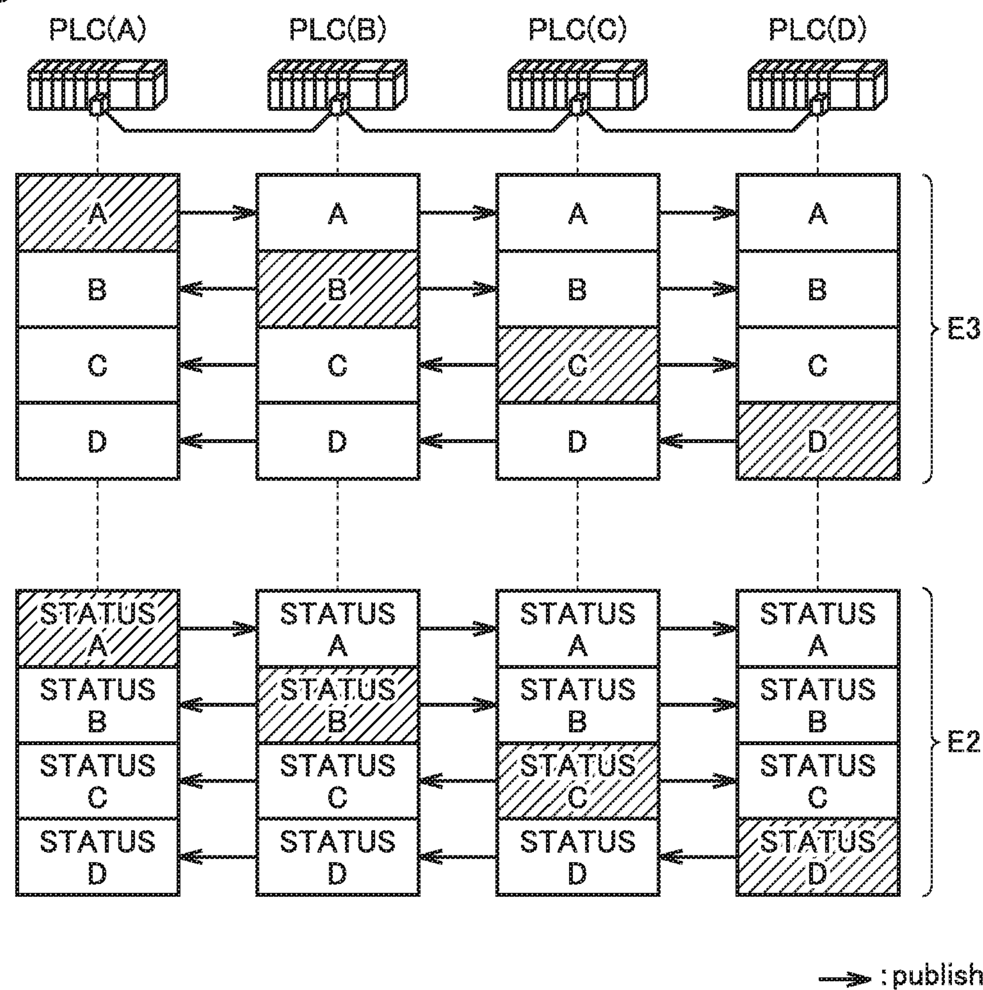
FIG. 3 is a diagram schematically illustrating data sharing (a data link) by pub/sub communication according to the present embodiment.

FIG. 3 is a diagram schematically illustrating data sharing (a data link) by pub/sub communication according to the present embodiment. The present embodiment may implement a so-called data sharing (a data link) by which PLCs 100 can utilize the data such as control data so as to be associated with one another while PLCs 100 exchange the data with one another. In the present embodiment, the unit of data transmitted in the pub/sub communication related to data sharing (data link) is defined as a data set. When the size of the data set is relatively large, for example, the data set may be divided into a plurality of units and transmitted.

In FIG. 3, each PLC 100 in communication system 1 is shown as PLC (A), PLC (B), PLC (C), and PLC (D) that form a multicast group in the pub/sub communication. PLC (A), PLC (B), PLC (C), and PLC (D) store data sets A, B, C and D, respectively, of their respective control data in their respective storage areas E3 of memories 104. Also, PLC (A), PLC (B), PLC (C), and PLC (D) each store the data sets included in PLCs 100 other than the corresponding one of PLC (A), PLC (B), PLC (C), and PLC (D) in the multicast group to which PLC (A), PLC (B), PLC (C), and PLC (D) belong. In this way, in the state where each of PLCs 100 belonging to the multicast group shares data sets A to D included in the multicast group to which each PLC 100 belongs, each of these PLCs 100 can control the control target for FA using the shared data sets A to D.

Furthermore, PLC (A), PLC (B), PLC (C), and PLC (D) store statuses A, B, C, and D, respectively, that are data showing their respective states in their respective storage areas E2. Also, PLC (A), PLC (B), PLC (C), and PLC (D) each store the statuses of PLCs 100 other than the corresponding one of PLC (A), PLC (B), PLC (C), and PLC (D) in the multicast group to which PLC (A), PLC (B), PLC (C), and PLC (D) belong. In this way, in the state where each of PLCs 100 belonging to the multicast group shares statuses A to D included in the multicast group to which each PLC 100 belongs, each of these PLC 100 can determine whether the above-mentioned reception allowing condition is satisfied or not based on the shared statuses A to D.

Sharing of data sets A to D and sharing of statuses A to D among PLCs 100 in the multicast group shown in FIG. 3 are implemented by pub/sub communication. Specifically, in the case of sharing of data sets A to D, when it is determined that the reception allowing condition is satisfied based on the states of other PLCs 100 shown by statuses A to D in storage area E2, publisher unit 140 in each PLC 100 reads its own data set from storage area E3 and transmits the read data set to each of other PLCs 100 in a multicast manner. Subscriber unit 130 in each of other PLCs 100 receives the data set through network 3 and stores the received data set in storage area E3.

Furthermore, in the case of sharing of statuses A to D, publisher unit 140 in each PLC 100 cyclically reads the status in storage area E2 and transmits the read status to each of other PLCs 100 in a multicast manner. Subscriber unit 130 in each of other PLCs 100 receives the status through network 3 and stores the received status in storage area E2.

D. Frame Configuration

FIGS. 4 an 5 each are a diagram showing an example of the configuration of the frame according to the present embodiment. FIG. 4 shows an example of the frame on which the data set is transmitted. Referring to FIG. 4, the frame stores: a sender publisher identifier (an identifier of PLC 100) as an identifier showing a sender; an identifier of the multicast group as an identifier showing a destination subscriber; and a data set to be transmitted. FIG. 5 shows an example of the frame on which the status showing the state of PLC 100 is transmitted. Referring to FIG. 5, the frame stores: a sender publisher identifier (an identifier of PLC 100) of a sender; an identifier of the multicast group as an identifier showing an destination subscriber; and a status to be transmitted. The destinations of the frames in FIGS. 4 and 5 are not limited to the identifier of the multicast group, but the identifiers of other PLCs 100 belonging to the multicast group may be stored, for example. Also, the frames in FIGS. 4 and 5 may store information used for error detection or error correction of the data (data set or status) in the frame received by the destination subscriber.

E. Functional Configuration of PLC 100

FIG. 6 is a diagram showing an example of the functional configuration of PLC 100 according to the present embodiment. FIG. 6 shows: memory 104 having storage areas E1 to E4 each storing the data related to pub/sub communication; subscriber unit 130; and publisher unit 140. Subscriber unit 130 and publisher unit 140 each are implemented by a program including pub/sub communication middleware or by a combination of this program and a circuit. This circuit may include an application specific integrated circuit (ASIC) or a field-programmable gate array (FPGA).

Processor 102 executes a required program, thereby causing subscriber unit 130 and publisher unit 140 to execute the process. This program may be stored in the storage unit including memory 104. When processor 102 executes the required program, the program as a target stored in the storage unit is developed in the RAM included in memory 104. Then, processor 102 causes its CPU to interpret and execute the program developed in the RAM so as to control each of the components in PLC 100.

Storage area E1 stores: a subscribe setting table 60 in which the information used for data exchange among PLCs 100 is set (stored); a publish setting table 70 in which the information used for publishing data is set (stored); and a publish status table 80 in which the information used for publishing the state of PLC 100 is set (stored). The details of these tables will be described later.

Storage area E2 stores: an own status 141 showing PLC 100's own state; and other statuses 142 showing the states of other PLCs 100 corresponding to the respective other PLCs 100. In the present embodiment, own status 141 shows whether or not PLC 100 can receive the data by pub/sub communication and process the data. For example, this state of PLC 100 includes the state of the program such as user application program 108 that processes the received data for controlling the target of FA. In the present embodiment, this state of the program is shown by a flag and includes three types of states of: under execution F1; under initialization F2; and abnormal F3, for example. In addition, system program 107 constantly detects the state of the program, to set the graph corresponding to the detected state among flags F1 to F3 of own status 141 as "1" and to set other flags as "0". Thereby, own status 41 may always show the latest state. In addition, the state of PLC 100 is not limited to the state of user application program 108. Also, the state of the program is not limited to the above-mentioned three types.

Storage area E3 includes: an area 15A in which the data set is stored by application program 108 of PLC 100 to which storage area E3 belongs; and areas 15B, 15C, and 15D in which the data sets received from other PLCs 100 in the multicast group to which this PLC 100 belongs are stored.

Storage area E4 stores a reception allowing condition 161 as described above.

Subscriber unit 130 controls network interface 120 to receive (subscribe) the frame transmitted over network 2. Specifically, subscriber unit 130 compares (verifies) the destination of the transmission frame input from network interface 120 with the identifier in the multicast group to which PLC 100 comprising this subscriber unit 130 belongs. Then, when subscriber unit 130 determines based on the comparison result that the transmission frame is a frame addressed to the multicast group to which PLC 100 comprising this subscriber unit 130 belongs, subscriber unit 130 receives and processes the content of the frame. More specifically, subscriber unit 130 includes: a status reception processing unit 131 that reads the status in the frame addressed to the multicast group to which PLC 100 comprising this subscriber unit 130 belongs, and then, stores the read status in storage area E2 as one of other statuses 142; and a data set reception processing unit 132 that reads the data set in the frame addressed to the multicast group to which PLC 100 comprising this subscriber unit 130 belongs, and then, stores the read data set in the relevant area among areas 15B to 15D in storage area E3.

Publisher unit 140 includes a publish determination unit 241, a status transmission processing unit 242, and a data set transmission processing unit 243. Status transmission processing unit 242 reads own status 141 in storage area E2 in each predetermined cycle (for example, 1 msec), and generates a frame storing the read own status 141 (see FIG. 5). Publisher unit 140 controls network interface 120 to transmit (publish) the generated frame through network 2.

Thereby, the latest own status 141 is transmitted in each predetermined cycle from each of PLCs 100 to other PLCs 100 in the multicast group to which each of these PLCs 100 belongs. Other PLCs 100 each cause subscriber unit 130 to receive this own status 141 so as to store the received own status 141 in storage area E2 as one of other statuses 142. Thus, each PLC 100 can constantly detect the latest state of each of all PLCs 100 in the multicast group to which each PLC 100 belongs.

Furthermore, when publisher unit 140 detects that the data set in area 15A of storage area E3 of PLC 100 of this publisher unit 140 has been updated (newly written), publish determination unit 241 determines whether the states of other PLCs 100 shown by other statuses 142 in storage area E2 satisfy reception allowing condition 161 or not. For example, reception allowing condition 161 indicates that all of flags F1 showing the states of other PLCs 100 being under execution in the multicast group are "1" (that is, the value of the AND operation of flag F1 is "1"). The reception allowing condition is not limited to the above.

When publish determination unit 241 determines that the reception allowing condition is satisfied, publisher unit 140 starts data transmission processing unit 243. When data set transmission processing unit 243 is started, it reads the data set of PLC 100 of this data set transmission processing unit 243 from area 15A in storage area E3 and generates a frame storing the read data set (see FIG. 4). Publisher unit 140 controls network interface 120 to transmit (publish) the generated frame through network 2.

Thereby, in the case of transmission of the data set of one PLC 100, when it is determined based on the latest states of other PLCs 100 in the multicast group that a transmission allowing condition 161 is satisfied, then, this data set is published (transmitted) to each of other PLCs 100 in the multicast group. Accordingly, when the data set is published (transmitted), this one PLC 100 can confirm that other PLCs 100 each can receive the data set.

F. Configuration of Various Types of Tables

Figure 7:
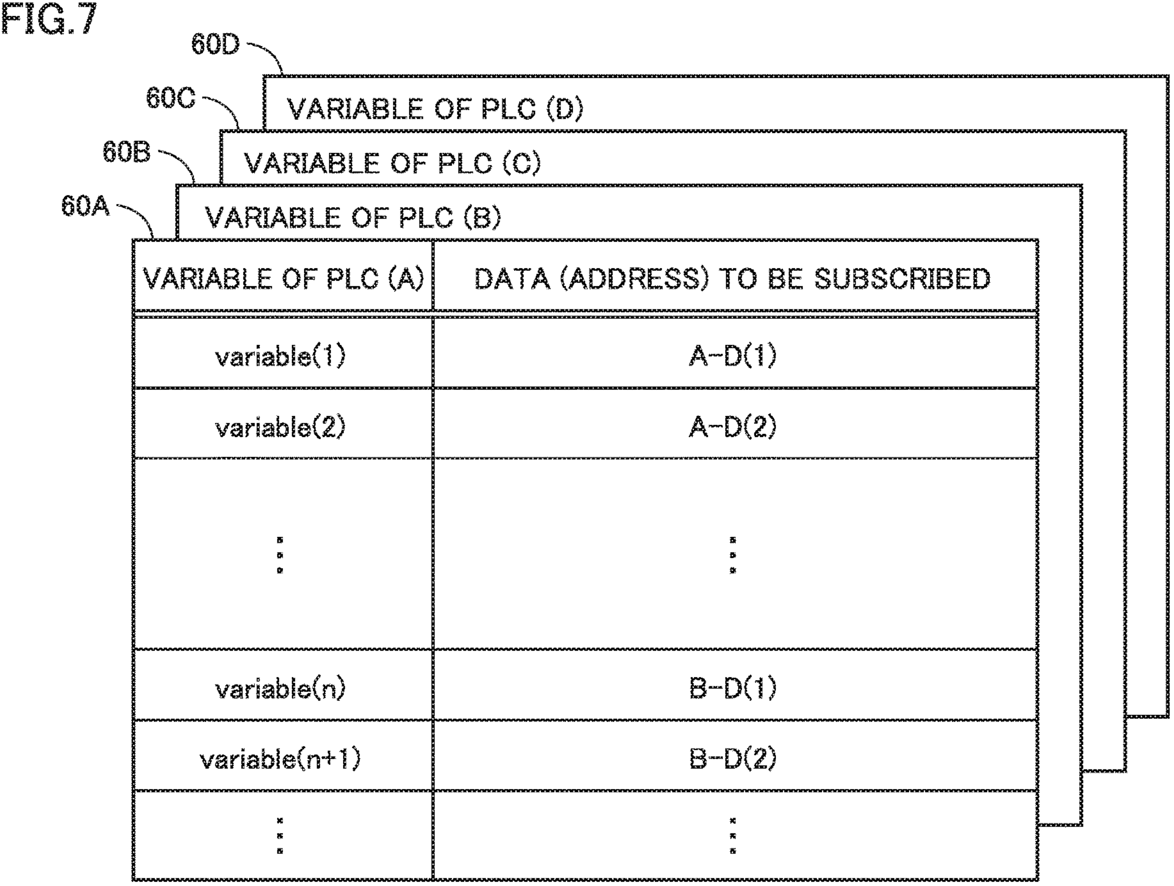
FIG. 7 is a diagram showing an example of the configuration of a subscribe setting table 60 in FIG. 6.

FIG. 7 is a diagram showing an example of the configuration of subscribe setting table 60 in FIG. 6. In FIG. 7, subscribe setting tables 60A, 60B, 60C, and 60D are stored in the respective PLCs 100 in communication system 1. In a common description of subscribe setting tables 60A to 60D, subscribe setting tables 60A to 60D will be collectively referred to as a subscribe setting table 60.

In subscribe setting table 60, the data for converting the data from other PLCs 100 into data that can be processed by PLC 100 of this subscribe setting table 60 is registered (stored). Specifically, in subscribe setting table 60, data names (addresses) subscribed (received) from other PLCs 100 are registered, and variable names to which user application program 108 of PLC 100 of this subscribe setting table 60 can refer are also registered in association with the respective data names. When the subscribed (received) data set is stored in storage area E3, based on subscribe setting table 60, data set reception processing unit 132 converts the name of each data in the data set into a variable name associated in subscribe setting table 60, and then, stores each data. This allows data exchange among PLCs 100 in the pub/sub communication. The data to be subscribed in subscribe setting table 60 may include data showing the state that is subscribed (received) from other PLCs 100.

Figure 8:
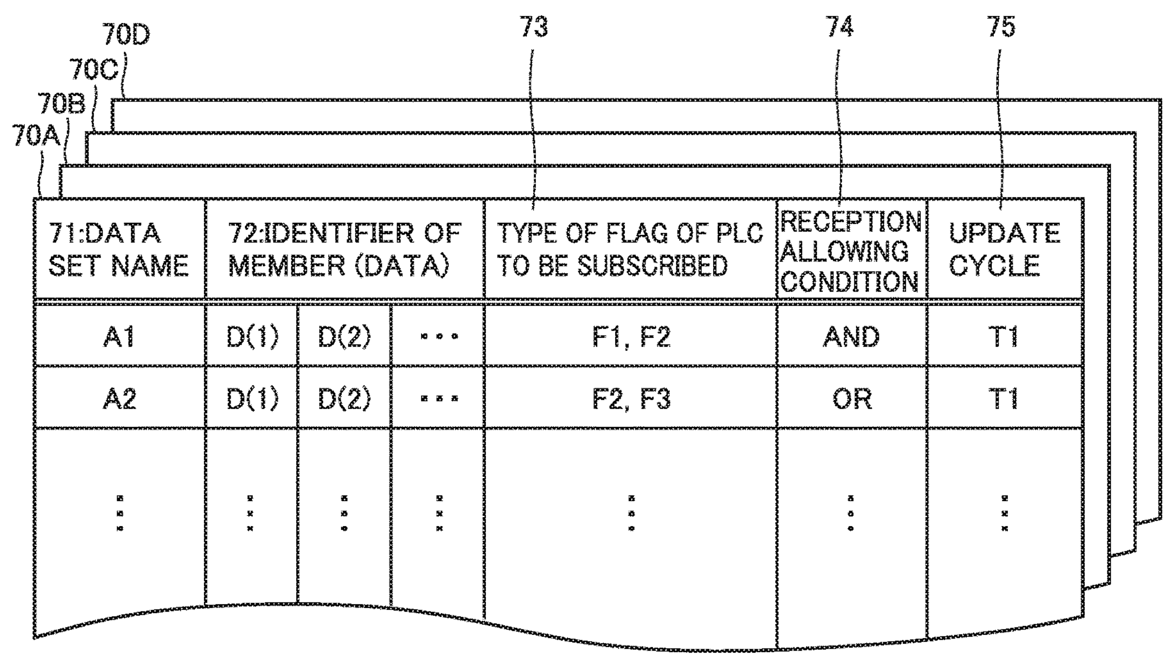
FIG. 8 is a diagram showing an example of the configuration of a publish setting table 70 in FIG. 6.

FIG. 8 is a diagram showing an example of the configuration of publish setting table 70 in FIG. 6. In FIG. 8, publish setting tables 70A, 70B, 70C, and 70D are stored in respective PLCs 100 in communication system 1. In a common description of publish setting tables 70A to 70D, publish setting tables 70A to 70D will be collectively referred to as a publish setting table 70.

In the present embodiment, PLC 100 may publish (transmit) one type of data set or a plurality of types of data sets. Publish setting table 70 includes data used for controlling publishing (transmission) of the control data such as a data set by publisher unit 140. Specifically, in association with each of various types of data sets published (transmitted) by PLC 100 of publish setting table 70, this publish setting table 70 includes: a data set name 71 as an identifier of the data set; an identifier 72 such as an address of the member (data) of the data set; a type 73 of a flag showing the state of PLC 100 that is to be subscribed (received); a reception allowing condition 74; and an update cycle 75 as a predetermined cycle in which the data in the data set is updated. Reception allowing condition 74 is set for each type of data set. On the other hand, for example, in the case where the reception allowing conditions applicable to all types of data sets are set to be the same, reception allowing condition 161 in storage area E4 may be applied. Furthermore, update cycle 75 is not limited for each type of data set, but may be set for each data constituting each type of data set.

Publisher unit 140 publishes (transmits) each data set according to the contents in publish setting table 70. In the present embodiment, among a plurality of types of data sets, the type of data set to be made public is set in advance. When publisher unit 140 determines based on update cycle 75 in publish setting table 70 that the corresponding data set has been updated, that is, when it determines that the publish (transmission) timing has come, publish determination unit 241 reads the flag shown by corresponding type 73 of the flag from flags F1 to F3 in other statuses 142. Then, publish determination unit 241 determines whether the state shown by the read flag satisfies corresponding reception allowing condition 74 or not. Thereby, cyclic publish (transmission) can be done in synchronization with update cycle 75.

Furthermore, status reception processing unit 131 subscribes (receives) the flag shown by type 73 of the flag in publish setting table 70 among the state flags published (transmitted) from other PLCs 100, and stores the subscribed flag in storage area E2 as one of other statuses 142.

According to publish setting table 70 in FIG. 8, reception allowing condition 74 and the type of the state used for determining this condition can be varied for each data set published in pub/sub communication. Furthermore, different contents may be set in publish setting table 70 in each PLC 100, and reception allowing condition 74 can be varied for each PLC 100. In publish setting table 70 in FIG. 8, reception allowing condition 74 is set for each data set, but reception allowing condition 74 may be set for each member (data) in the data set.

In the present embodiment, only the predetermined type of data set is registered in publish setting table 70 in FIG. 8 as a target to be made public (published), but the registration method is not limited thereto. For example, among the plurality of types of data sets registered in publish setting table 70, publisher unit 140 may selectively read only the type of data set conforming to the predetermined setting and publish (transmit) the read data set.

Figure 9:
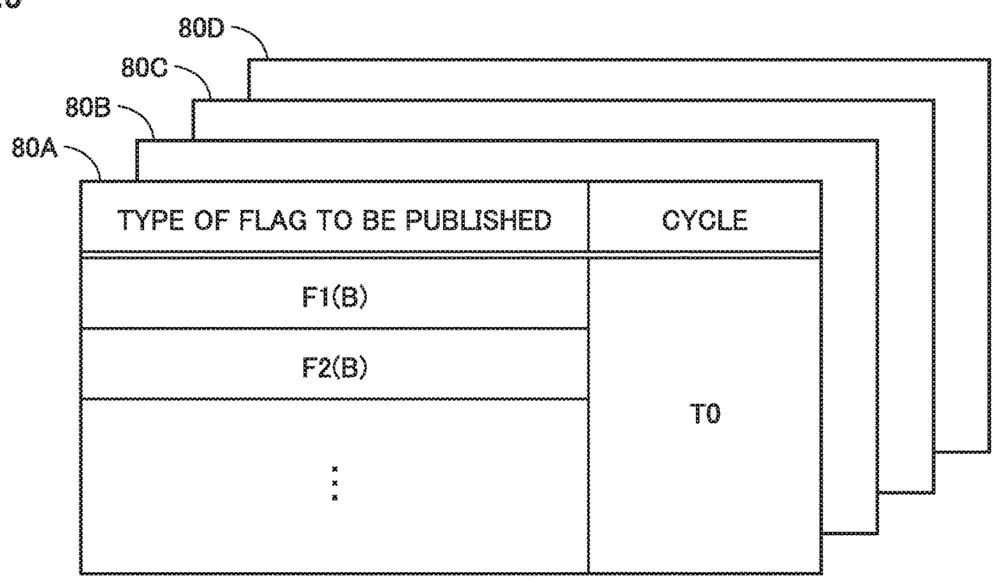
FIG. 9 is a diagram showing an example of the configuration of a publish status table 80 in FIG. 6.

FIG. 9 is a diagram showing an example of the configuration of publish status table 80 in FIG. 6. In FIG. 9, publish status tables 80A, 80B, 80C, and 80D are stored in their respective PLCs 100 in communication system 1. In a common description of publish status tables 80A to 80D, publish status tables 80A to 80D will be collectively referred to as a publish status table 80.

Referring to FIG. 9, publish status table 80 includes data used for controlling publish (transmission) of own status 141 by publisher unit 140. Specifically, publish status table 80 includes: a type of the state (flag type) that is to be published (transmitted) by status transmission processing unit 242 in PLC 100 of this publish status table 80; and a publishing (transmitting) cycle. Thereby, the type of the state to be published by each PLC 100 and the publishing cycle by each PLC 100 in pub/sub communication each can be set to be different among PLCs 100.

G. Communication Sequence

Figure 10:
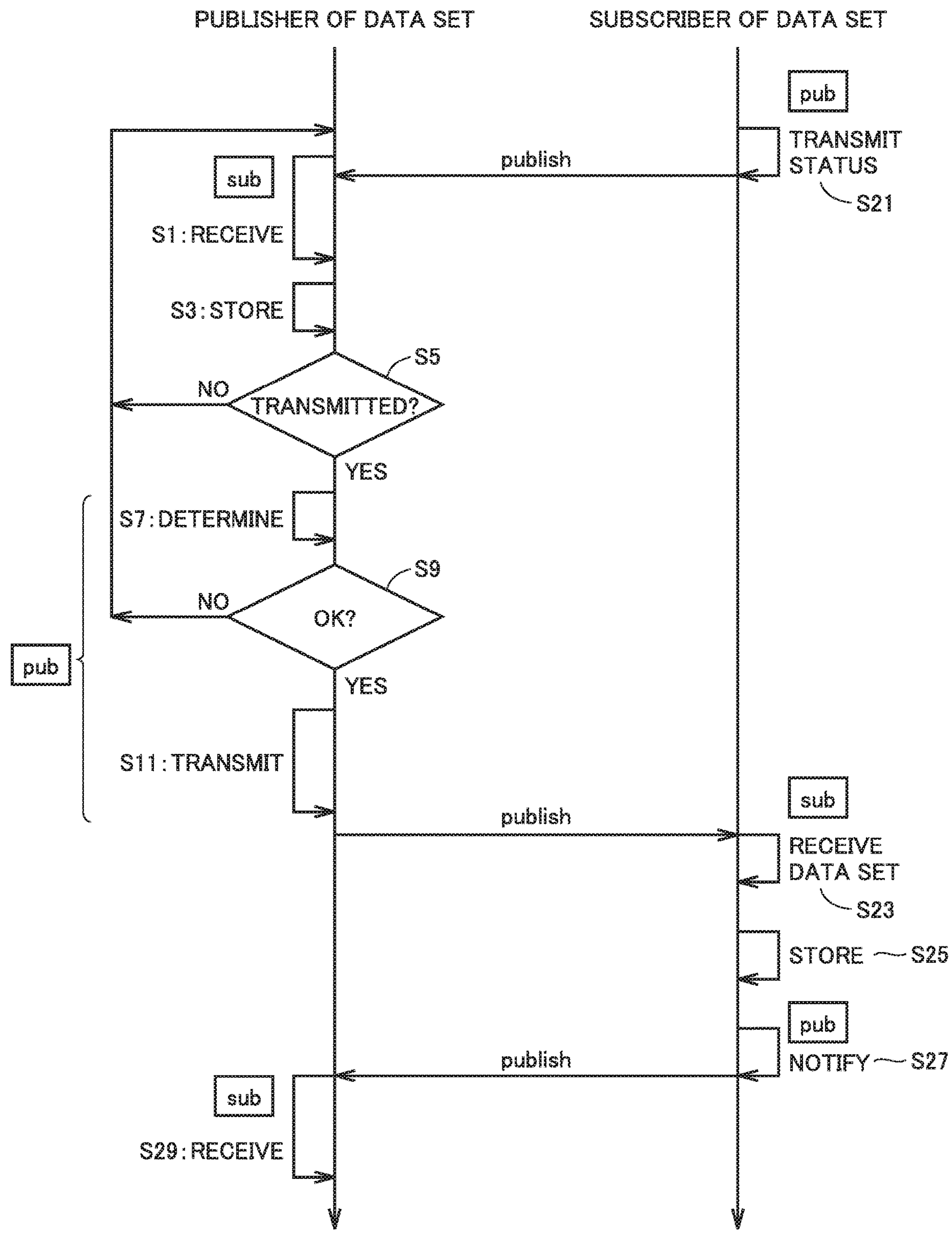
FIG. 10 is a diagram showing an example of a communication sequence according to the present embodiment.

FIG. 10 is a diagram showing an example of a communication sequence according to the present embodiment. Referring to FIG. 10, the communication sequence in the multicast group for publishing (transmission) of the data set in communication system 1 will be hereinafter described.

First, publisher unit 140 in PLC 100 as a subscriber of the data set publishes (transmits) status 141 (step S21).

Subscriber unit 130 in PLC 100 as a publisher of the data set receives statuses 141 from other PLCs 100, and stores the received statuses in storage area E2 as other statuses 142 (steps S1 and S3). PLC 100 as a publisher determines whether the data set is updated or not (step S5). When the data set is not updated (NO in step S5), the process returns to step S1. When the data set is updated (YES in step S5), publish determination unit 241 determines based on the states of other PLCs 100 shown by other statuses 142 in storage area E2 whether reception allowing condition 161 is satisfied or not (step S7).

When publish determination unit 241 determines that reception allowing condition 161 is not satisfied (NO in step S9), the data set is not published (transmitted) and the process returns to step 1. On the other hand, when publish determination unit 241 determines that reception allowing condition 161 is satisfied (YES in step S9), publisher unit 140 publishes (transmits) the data set (step S11). Other PLCs 100 each subscribe (receive) the published data set and store the data sets in each storage area E3 (steps S23 and S25).

Furthermore, in the present embodiment, when the subscriber's PLC 100 succeeds in receiving the published data set (step S23), publisher unit 140 may publish (transmit) a notification showing success of reception (step S27). Thereby, PLC 100 as a sender of the data set can receive the notification (step S29) and confirm success of transmission of the data set. It should be noted that this notification may also include a notification requesting retransmission of the data set when reception of the data set does not succeed.

According to the communication sequence in FIG. 10, when the data set is updated, publisher unit 140 does not publish (transmit) the updated data set if reception allowing condition 161 is not satisfied, whereas publisher unit 140 publishes (transmits) the updated data set if the reception allowing condition is satisfied. Thereby, the same data set can be shared among PLCs 100. For example, in the case where the data set is recipe data showing a production procedure and the like, the recipe data can be shared. This can therefore prevent a situation in which the production procedure is inconsistent among PLCs 100*s* because the recipe data before update and the recipe data after update mixedly exist in the multicast group, that is, because the same recipe data cannot be shared in the multicast group.

Furthermore, in the pub/sub communication, no connection is established among PLCs 100 when starting communication of the data set and the status, so that the load upon each PLC 100 can be reduced, and the process can be accelerated. Furthermore, when the state of PLC 100 as a subscriber satisfies the reception allowing condition without establishing connection, the data set is published (transmitted). Accordingly, PLC 100 serving as a subscriber can reliably receive the published data set.

H. Configuration of Support Device 500

Figure 11:
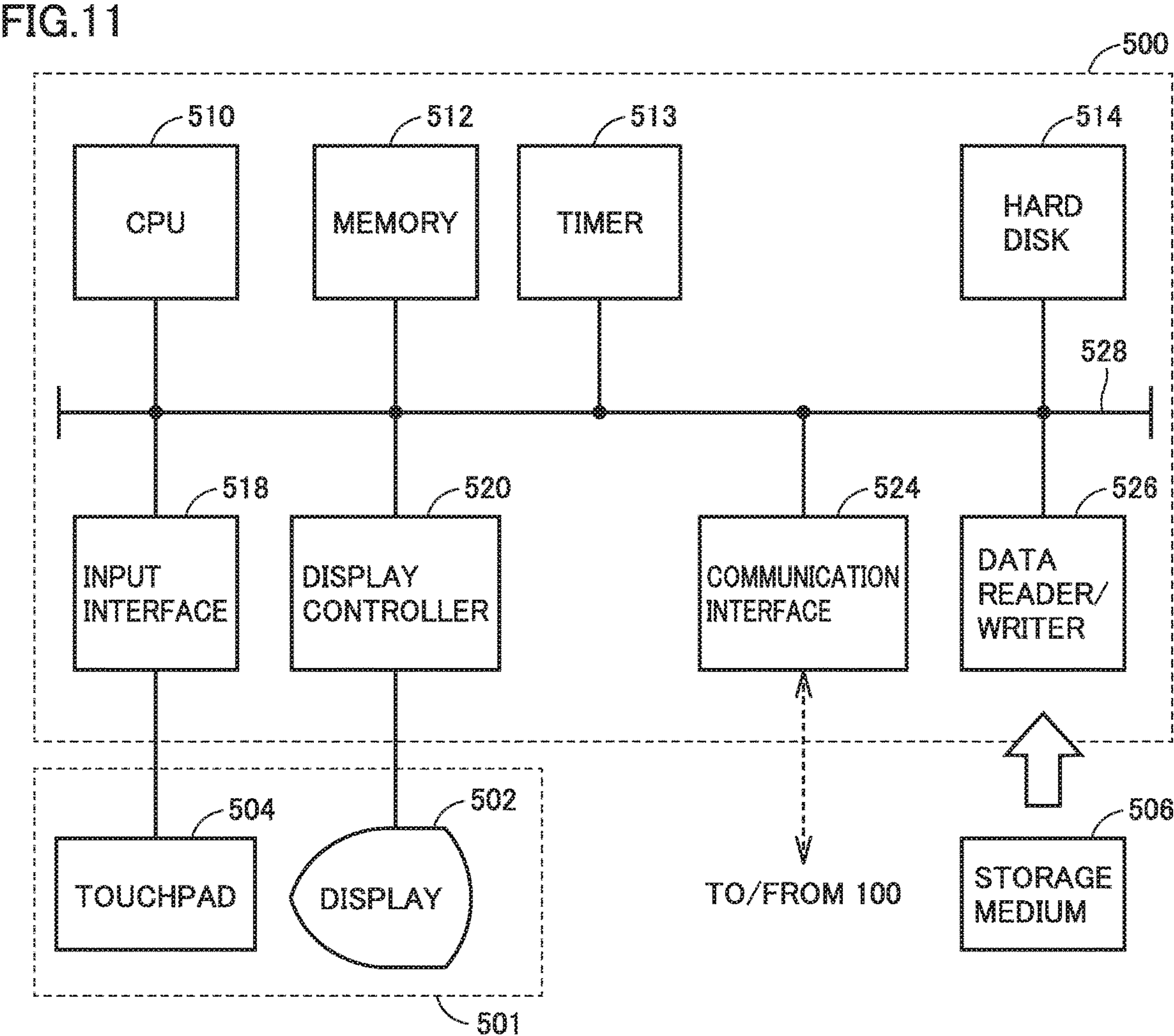
FIG. 11 is a diagram schematically showing the configuration of a support device 500 according to the present embodiment.

The following is an explanation about the process by a setting device that sets the information for pub/sub communication by support device 500 in PLC 100. FIG. 11 is a diagram schematically showing the configuration of support device 500 according to the present embodiment. Referring to FIG. 11, support device 500 includes a central processing unit (CPU) 510, memory 512 and a hard disk 514 each as a storage unit, a timer 513, an input interface 518, a display controller 520, a communication interface 524, and a data reader/writer 526. These components are connected so as to allow data communication with one another through a bus 528.

CPU 510 executes the program (code) stored in hard disk 514, thereby executing various kinds of operations. Memory 512 is typically a volatile storage device such as a dynamic random access memory (DRAM). Memory 512 stores not only the program data read from hard disk 514, but also the data received from data reader/writer 526, work data, and the like.

Input interface 518 relays data transmission between CPU 510 and an input device such as a touchpad 504, a mouse (not shown) and a keyboard (not shown). Display controller 520 is connected to a display 502 as a typical example of a display device, and generates a signal for driving display 502 according to the displayed data to drive display 502 by the generated signal. Touchpad 504 and display 502 may be integrally configured as a touch screen 501.

Communication interface 524 relays data transmission to and from PLCs 100 through a universal serial bus (USB) and the like. Data reader/writer 526 relays data transmission between CPU 510 and an external storage medium 506. Also, other output devices such as a printer may be connected to support device 500 as required.

In addition, storage medium 506 is distributed in the state where it stores a program and the like executed by support device 500. Data reader/writer 526 reads the program from this storage medium 506. Storage medium 506 may include: a general-purpose semiconductor storage device such as a compact flash (CF) and a secure digital (SD); a magnetic storage medium such as a flexible disk; an optical storage medium such as a compact disk read only memory (CD-ROM); and the like.

I. Function of Support Device 500

Figure 12:
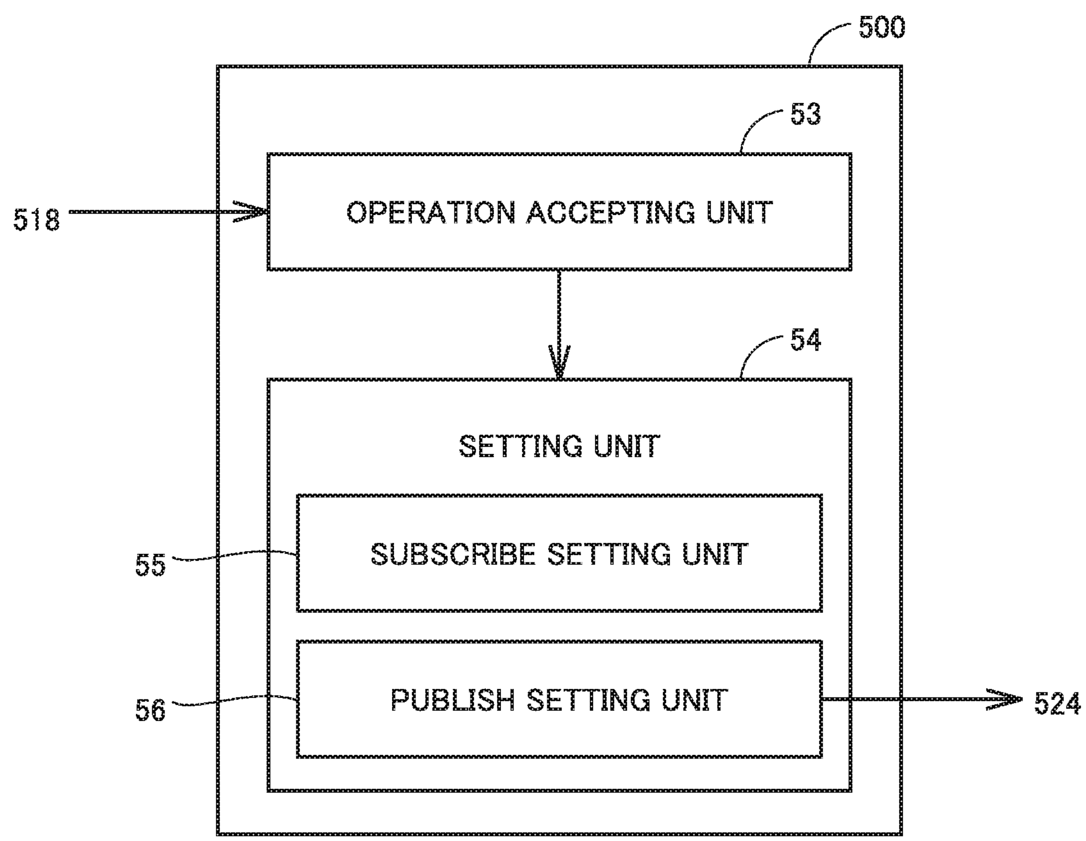
FIG. 12 is a diagram illustrating the functional configuration of a support device according to the present embodiment.

FIG. 12 is a diagram illustrating the functional configuration of the support device according to the present embodiment. Referring to FIG. 12, support device 500 includes: an operation accepting unit 53 that accepts a user operation for this support device through input interface 518; and a setting unit 54. Based on the content of the user operation accepted by operation accepting unit 53, setting unit 54 sets various types of data including transmission allowing condition 161 in support device 500.

Setting unit 54 includes a subscribe setting unit 55 and a publish setting unit 56. Based on the content of the user operation accepted by operation accepting unit 53, subscribe setting unit 55 sets data in subscribe setting table 60 in PLC 100. Furthermore, based on the content of the user operation accepted by operation accepting unit 53, publish setting unit 56 sets data in publish setting table 70 and publish status table 80 in PLC 100.

By operating support device 500, the user can set data in subscribe setting table 60, publish setting table 70 and publish status table 80 in each of other PLCs 100 through network 3 and PLC 100 as a connection destination, in the same manner as described above.

As support device 500 executes a required program, operation accepting unit 53 and setting unit 54 may execute the process. The program may be stored in a storage unit including storage medium 506, memory 512, and hard disk 514. When support device 500 executes a required program, a target program stored in the storage unit is developed in a RAM included in memory 512. Then, CPU 510 interprets and executes the program developed in the RAM so as to control each component in support device 500.

J. Illustration of Reception Allowing Condition

Figure 13:
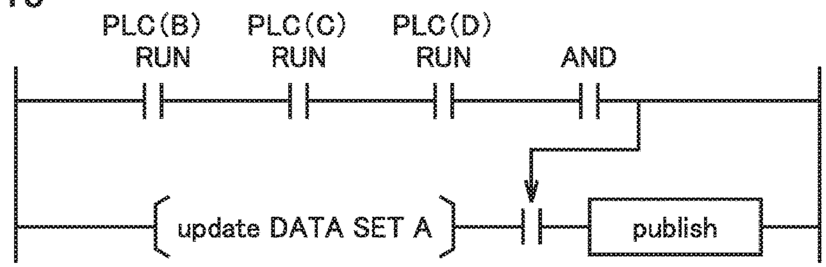
FIG. 13 is a diagram showing an example of a reception allowing condition 161 according to the present embodiment.

FIG. 13 is a diagram showing an example of reception allowing condition 161 according to the present embodiment. Referring to FIG. 13, reception allowing condition 161 is shown as a code of a ladder program executable by PLC 100. In the present embodiment, the state where PLC 100 can receive a data set shows that the state of user application program 108 is under execution (flag F1="1"). Also, other states, that is, the state where application program 108 is under initialization before execution (flag F2="1") or is abnormal (flag F3="1"), show the state where the data set cannot be received.

For example, when PLC 100 that publishes the data set is defined as PLC (A), reception allowing condition 161 set in PLC (A) shows the follow situation. Specifically, as shown in FIG. 13, when data set A is published (that is, when data set A is updated), and when, among other statuses 142 in storage area E2, all of the values of flags F1 in other PLC (B) to PLC (D) in the multicast group to which PLC (A) belongs are under execution (RUN), that is, when the result of the AND operation of flag F1 is "1", reception allowing condition 161 is satisfied, so that publishing (transmission) of updated data set A is permitted. In other words, when the result of the AND operation is "0", reception allowing condition 161 is not satisfied, so that publishing (transmission) of updated data set A is prohibited.

Furthermore, reception allowing condition 74 in publish setting unit 70 is also set as a code of the ladder program similar to that in FIG. 13.

In FIG. 13, "AND" is used as an operator of reception allowing condition 161, but the operator is not limited thereto, and for example may be "OR", "XOR (exclusive OR)" and the like, and may also be a combination of these two or more operators. As reception allowing condition 161 in FIG. 13, the values of flags F1 in other PLCs 100 are used as operands, but the values of other types of flags may be used. Also, as reception allowing condition 161 in FIG. 13, all flags F1 in other PLCs 100 in the multicast group are used as operands, but only flags F1 in predetermined PLCs 100 among other PLCs 100 may be used without using all flags F1.

In FIG. 13, reception allowing condition 161 is shown as a code of the ladder program, but is not limited to the code of the ladder program as long as the code can be executed by processor 102 in PLC 100.

K. Setting Process

Figure 14:
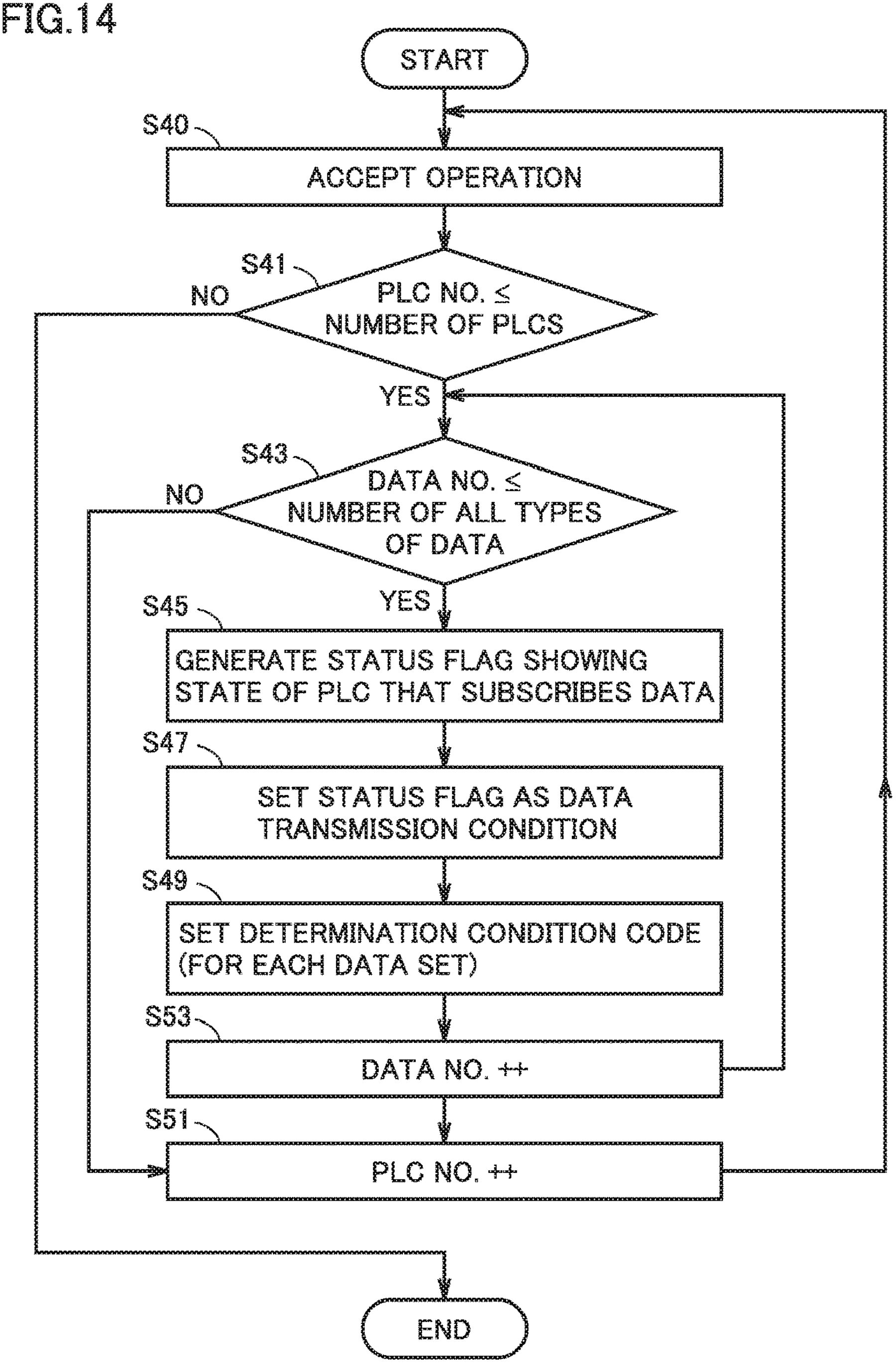
FIG. 14 is a diagram showing an example of a flowchart of a data setting process according to the present embodiment.

FIG. 14 is a diagram showing an example of a flowchart of the data setting process according to the present embodiment. The program according to the flowchart in FIG. 14 is stored in support device 500 as a data setting tool for setting, in PLC 100, the data such as subscribe setting table 60, publish setting table 70, publish status table 80, and reception allowing condition 161. Then, this program is executed by CPU 510. Referring to FIG. 14, the process of setting mainly in publish setting table 70 for each data set will be described below by way of example.

When the data setting tool is started in support device 500, the user operates touch screen 501 and the like to input data. Operation accepting unit 53 accepts a user operation content (step S40).

Based on the accepted user operation content, setting unit 54 sets data in publish setting table 70 in PLC 100 while designating each of PLCs 100 connected to network 3 (a loop process of step S41 to step S51). This loop process includes the process of setting data for each data set (the loop process of steps S43 to S49) for each PLC 100.

In the loop process of data setting for each data set, publish setting unit 56 in setting unit 54 sets, in publish status table 80, the type of the flag of the state that is to be published (transmitted) by PLC 100 and the cycle in which PLC 100 publishes (transmits) (step S45).

Furthermore, publish setting unit 56 sets data set name 71 and data (member) identifier 72 in publish setting table 70 in PLC 100 for each data set, and also generates and sets type 73 of the flag used for determining reception allowing condition 74 among the flags in other PLCs 100 that subscribe (receive) the data sets (step S47).

Furthermore, publish setting unit 56 sets reception allowing condition 74 for each data set (step S49). For example, publish setting unit 56 sets the code as shown in FIG. 13 as reception allowing condition 74.

Setting unit 54 determines whether the next data set requiring data setting exists or not (steps S53 and S43). When setting unit 54 determines that the next data set exits (YES in step S43), publish setting unit 56 performs the setting process in steps S45 to S49 for publish setting table 70 and publish status table 80 in the next data set.

On the other hand, when it is determined that the next data set does not exist (NO in step S43), that is, when the data setting in one PLC 100 ends, it is determined whether the next PLC 100 requiring data setting exists or not (steps S51 and S41). When it is determined that the next PLC 100 exists (YES in step S41), publish setting unit 56 performs the setting process in steps S43 to S53 for publish setting table 70 and publish status table 80 in the next PLC 100. When it is determined that the next PLC 100 does not exist (NO in step S41), that is, when the data settings for all of PLCs 100 connected to network 3 end, the process in FIG. 14 ends.

According to the data setting tool in FIG. 14, the user operates support device 500 connectable to PLC 100, thereby allowing setting of the data including the reception allowing condition for implementing the pub/sub communication for each PLC 100.

L. Program

Processor 102 in PLC 100 controls each component in PLC 100 according to the pub/sub communication or the above-described process of the data setting tool. Storage 106 is an auxiliary storage device such as a hard disk drive and a solid state drive, for example, and may store: system program 107 and application program 108 that are executed by processor 102; a program and data related to pub/sub communication and the above-mentioned data setting tool; and the like.

CPU 510 in support device 500 controls each component in support device 500 for executing the program of the above-mentioned data setting tool. Hard disk 514 is an auxiliary storage device, and may store the system program executed by CPU 510, the program and data for the data setting tool, and the like. The auxiliary storage device is not limited to a hard disk, but may for example be a solid state and the like, or may be storage medium 506. Storage medium 506 is a medium in which the information such as a program recorded in storage medium 506 is accumulated through an electric action, a magnetic action, an optical action, a mechanical action, or a chemical action such that other devices including a computer, machines and the like can read the information such as a program. Support device 500 may obtain the program of the above-mentioned data setting tool from this storage medium 506.

Furthermore, when PLC 100 is integrally provided with the configuration of support device 500, PLC 100 may obtain the program of the data setting tool from storage medium 506. Furthermore, storage medium 506 may store the program of the communication sequence shown in FIG. 10. In this case, PLC 100 may obtain the program of the communication sequence from storage medium 506.

In addition, the program or data for PLC 100 or support device 500 may be downloaded to PLC 100 or support device 500 through various types of communication lines including network 3.

M. Functions and Effects

According to the present embodiment as described above, control data can be exchanged among the PLCs according to the pub/sub type communication protocol. In other words, control data can be exchanged by the pub/sub communication through which no connection is established. Thereby, as compared with other communication schemes requiring establishment of connection, the load upon the process in PLC 100 including communication and the communication load (traffic) upon communication system 1 can be reduced while the process and the communication can be accelerated.

Furthermore, PLC 100 on the publisher side publishes (transmits) the control data when the states of other PLCs 100 on the subscriber side satisfy reception allowing condition 161 (or reception allowing condition 74). This allows improvement in reliability with which other PLCs 100 on the subscriber side can subscribe (receive) the control data even when no connection is established.

N. Supplementary Notes

The present embodiment includes the following technical idea.

[Configuration 1]

A communication system (1) in which a plurality of control devices (100) for controlling factory automation are connected to a network (3), wherein a communication protocol among the control devices includes a publish/subscribe type, each of the control devices includes:

a data storage unit (E3) in which control data (15A) for the factory automation is stored;

a publisher unit (140) that transmits data including a state (141) of the control device of the publisher unit itself to each of other control devices than the control device; and a subscriber unit (130) that receives data from each of the other control devices, and when a state (142) of each of the other control devices that is received by the subscriber unit satisfies a reception allowing condition (161, 74), the publisher unit transmits the control data of the control device of the publisher unit itself to each of the other control devices.

[Configuration 2]

The communication system according to configuration 1, wherein the control data in the data storage unit is updated in a predetermined cycle, the control data includes a plurality of types of control data, and among the types of control data, the publisher unit transmits one or more types of control data conforming to a predetermined setting in synchronization with the predetermined cycle.

[Configuration 3]

The communication system according to configuration 1 or 2, wherein the control data includes a plurality of types of control data, and the reception allowing condition is different for each of the types of control data.

[Configuration 4]

The communication system according to any one of configurations 1 to 3, wherein the reception allowing condition is configured to include an operation using a value shown by the state.

[Configuration 5]

The communication system according to any one of configurations 1 to 3, wherein the publisher unit cyclically transmits the state.

[Configuration 6]

The communication system according to any one of configurations 1 to 5, wherein the publisher unit transmits a notification when the publisher unit receives the control data from at least one of the other control devices.

[Configuration 7]

A setting device (500) that sets information in each of a plurality of control devices (100) connectable to a network (3) of factory automation, wherein a communication protocol between a control device and other control devices among the control devices includes a publish/subscribe type, each of the control devices includes:

a data storage unit (E3) in which control data (15A) of the factory automation is stored;

a publisher unit (140) that transmits data including a state of the control device of the publisher unit itself to each of the other control devices; and a subscriber unit (130) that receives data from each of the other control devices, and the setting device includes a setting unit (54) that sets a reception allowing condition (161, 74) of the control data that is to be received by the subscriber unit of each of the other control devices such that the reception allowing condition includes a state received from each of the other control devices.

[Configuration 8]

The setting device according to configuration 7, wherein the control data in the data storage unit is updated in a predetermined cycle, the control data includes a plurality of types of control data, and among the types of control data, the publisher unit transmits one or more types of control data conforming to a predetermined setting in synchronization with the predetermined cycle.

[Configuration 9]

The setting device according to configuration 7 or 8, further comprising an operation accepting unit (53) that accepts a user operation for the setting device, wherein the setting device sets the reception allowing condition based on a content of the user operation accepted.

[Configuration 10]

The setting device according to any one of configurations 7 to 9, wherein the control data includes a plurality of types of control data, and the setting unit sets the reception allowing condition that is different for each of the types of control data.

[Configuration 11]

The setting device according to any one of configurations 7 to 10, wherein the reception allowing condition is configured to include an operation using a value shown by the state.

[Configuration 12]

A control device (100) applied to a communication system (1) in which a plurality of control devices (100) for controlling factory automation are connected to a network (3), wherein a communication protocol among the control devices includes a publish/subscribe type, each of the control devices includes:

a data storage unit (E3) in which control data (15A) of the factory automation is stored;

a publisher unit (140) that transmits data including a state of the control device of the publisher unit itself to each of other control devices than the control device; and a subscriber unit (130) that receives data from each of the other control devices, and when a state of each of the other control devices that is received by the subscriber unit satisfies a reception allowing condition (161, 74), the publisher unit transmits the control data of the control device of the publisher unit itself to each of the other control devices.

[Configuration 13]

The control device according to configuration 12, wherein the control data in the data storage unit is updated in a predetermined cycle, the control data includes a plurality of types of control data, and among the types of control data, the publisher unit transmits one or more types of control data conforming to a predetermined setting in synchronization with the predetermined cycle.

[Configuration 14]

A setting method of setting information in each of a plurality of control devices (100) connectable to a network (3) of factory automation, wherein a communication protocol among the control devices includes a publish/subscribe type, each of the control devices includes:

a data storage unit (E3) in which control data (15A) of the factory automation is stored;

a publisher unit (140) that transmits data including a state of the control device of the publisher unit itself; and a subscriber unit (130) that receives data from each of other control devices than the control device, and the setting method comprises:

by a processor (510), accepting a user operation for the processor; and by the processor, by using a content of the user operation, setting a reception allowing condition (161, 74) of the control data that is to be received by the subscriber unit of each of the other control devices such that the reception allowing condition includes a state (142) received from each of the other control devices.

[Configuration 15]

The setting method according to configuration 14, wherein the control data in the data storage unit is updated in a predetermined cycle, the control data includes a plurality of types of control data, and among the types of control data, the publisher unit transmits one or more types of control data conforming to a predetermined setting in synchronization with the predetermined cycle.

[Configuration 16]

A program for causing a computer (510) to execute the setting method according to configuration 14 or 15.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 communication system, 2, 3 network, 53 operation accepting unit, 54 setting unit, 55 subscribe setting unit, 56 publish setting unit, 60 subscribe setting table, 70 publish setting table, 74, 161 reception allowing condition, 80 publish status table, 100 PLC.

The invention claimed is:

1. A communication system in which a plurality of control devices for controlling factory automation are connected to a network, wherein a communication protocol among the control devices includes a publish/subscribe type, each of the control devices includes:

a data storage in which control data of the factory automation is stored; and a processor configured to perform operations comprising:

operation as a publisher module that transmits data including a state of the control device of the publisher module itself to each other control device; and operation as a subscriber module that receives data from each of the other control devices, each of the control devices executes a program to control a control target by using the control data, the state of each of the control devices includes an execution state of the program, the control data includes a plurality of types of control data, and when the state of each of the other control devices that is received by operation as the subscriber module satisfies a reception allowing condition that is different for each of the types of control data, operation as the publisher module comprises transmitting the control data of the control device of the respective publisher module to each of the other control devices.

2. The communication system according to claim 1, wherein the control data in the data storage is updated in a predetermined cycle, and among the types of control data, operation as the publisher module comprises transmitting one or more types of control data conforming to a predetermined setting in synchronization with the predetermined cycle.

3. The communication system according to claim 1, wherein the reception allowing condition includes an operation using a value shown by the state.

4. The communication system according to claim 1, wherein the publisher module cyclically transmits the state.

5. The communication system according to claim 1, wherein the publisher module transmits a notification when the publisher module receives the control data from at least one of the other control devices.

6. A setting device that sets information in each of a plurality of control devices connectable to a network of factory automation, wherein a communication protocol between a control device and other control devices among the control devices includes a publish/subscribe type, each of the control devices includes:

a data storage in which control data of the factory automation is stored; and a processor configured to perform operations comprising:

operation as a publisher module that transmits data including a state of the control device of the publisher module itself to each other control device; and operation as a subscriber module that receives data from each of the other control devices, each of the control devices executes a program to control a control target by using the control data, the state of each of the control devices includes an execution state of the program, the control data includes a plurality of types of control data, and the setting device includes a setting module that sets a reception allowing condition of the control data that is to be received by operation as the subscriber module of each of the other control devices such that the reception allowing condition is different for each of the types of control data and includes the state received from each of the other control devices.

7. The setting device according to claim 6, wherein the control data in the data storage is updated in a predetermined cycle, and among the types of control data, operation as the publisher module comprises transmitting one or more types of control data conforming to a predetermined setting in synchronization with the predetermined cycle.

8. The setting device according to claim 6, further comprising an operation accepting module that accepts a user operation for the setting device, wherein the setting device sets the reception allowing condition based on a content of the user operation accepted.

9. The setting device according to claim 6, wherein the reception allowing condition includes an operation using a value shown by the state.

10. A control device applied to a communication system in which a plurality of control devices for controlling factory automation are connected to a network, wherein a communication protocol among the control devices includes a publish/subscribe type, each of the control devices includes:

a data storage in which control data of the factory automation is stored; and a processor configured to perform operations comprising:

operation as a publisher module that transmits data including a state of the control device of the publisher module itself to each other control device; and operation as a subscriber module that receives data from each of the other control devices, each of the control devices executes a program to control a control target by using the control data, the state of the control device includes an execution state of the program, the control data includes a plurality of types of control data, and when the state of each of the other control devices that is received by operation as the subscriber module satisfies a reception allowing condition that is different for each of the types of control data, operation as the publisher module comprises transmitting the control data of the control device of the publisher module itself to each of the other control devices.

11. The control device according to claim 10, wherein the control data in the data storage is updated in a predetermined cycle, and among the types of control data, operation as the publisher module comprises transmitting one or more types of control data conforming to a predetermined setting in synchronization with the predetermined cycle.

12. A setting method of setting information in each of a plurality of control devices connectable to a network of factory automation, wherein a communication protocol among the control devices includes a publish/subscribe type, each of the control devices includes:

a data storage in which control data of the factory automation is stored;

a publisher module that transmits data including a state of the control device of the publisher module itself to each other control device;

a subscriber module that receives data from each of the other control devices, each of the control devices executes a program to control a control target, the state of the control device includes an execution state of the program, the control data includes a plurality of types of control data, and the setting method comprises:

by a processor, accepting a user operation for the processor; and by the processor, by using a content of the user operation, setting a reception allowing condition of the control data that is to be received by the subscriber module of each of the other control devices such that the reception allowing condition is different for each of the types of control data and includes the state received from each of the other control devices.

13. The setting method according to claim 12, wherein the control data in the data storage is updated in a predetermined cycle, and among the types of control data, operation as the publisher module comprises transmitting one or more types of control data conforming to a predetermined setting in synchronization with the predetermined cycle.

14. A non-transitory computer-readable storage medium storing a program for causing a computer to execute a method, the method of setting information in each of a plurality of control devices connectable to a network of factory automation, wherein a communication protocol among the control devices includes a publish/subscribe type, each of the control devices includes:

a data storage in which control data of the factory automation is stored;

a publisher module that transmits data including a state of the control device of the publisher module itself to each other control device; and a subscriber module that receives data from each of the other control devices, each of the control devices executes a program to control a control target, the state of the control device includes an execution state of the program, the control data includes a plurality of types of control data, and the method comprises:

by a processor, accepting a user operation for the processor; and by the processor, by using a content of the user operation, setting a reception allowing condition of the control data that is to be received by the subscriber module of each of the other control devices such that the reception allowing condition is different for each of the types of control data and includes the state received from each of the other control devices.

15. The non-transitory computer-readable storage medium according to claim 14, wherein the control data in the data storage is updated in a predetermined cycle, and among the types of control data, the publisher module transmits one or more types of control data conforming to a predetermined setting in synchronization with the predetermined cycle.

* * * * *